Figure 1:
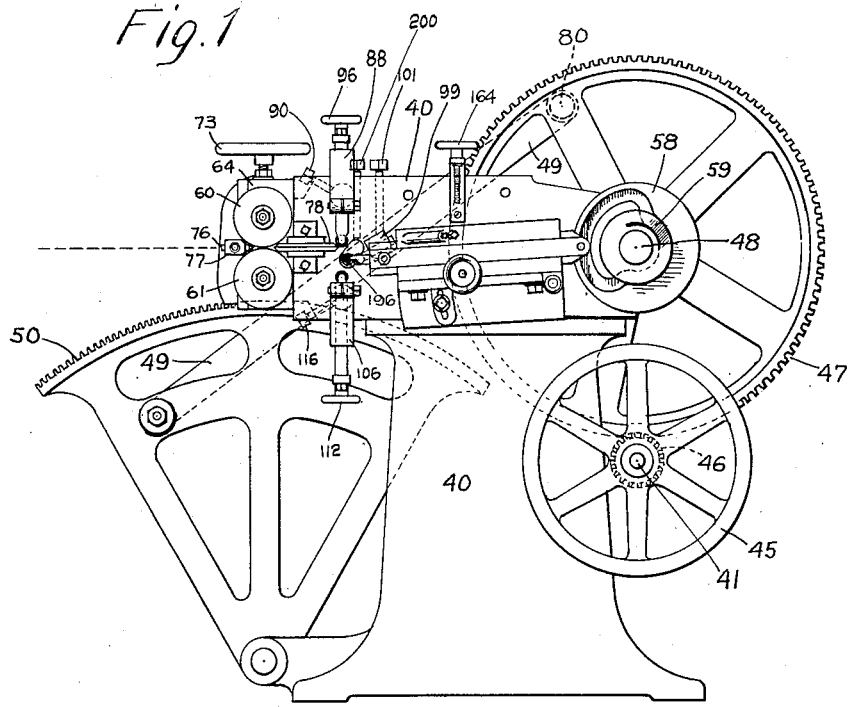

A. J. LEWIS.
MACHINE FOR MAKING COIL SPRINGS.
APPLICATION FILED JAN. 4, 1913.

1,083,501.

Patented Jan. 6, 1914.
8 SHEETS—SHEET 1.

WITNESSES:
H. W. Meade
S. W. Atherton.

INVENTOR
Arthur J. Lewis
BY
A. M. Wooster
ATTORNEY

A. J. LEWIS.
MACHINE FOR MAKING COIL SPRINGS.
APPLICATION FILED JAN. 4, 1913.

1,083,501.

Patented Jan. 6, 1914.

8 SHEETS—SHEET 2.

WITNESSES:
H. W. Meade
S. W. Atherton

INVENTOR
Arthur J. Lewis
BY
A. M. Wooster
ATTORNEY

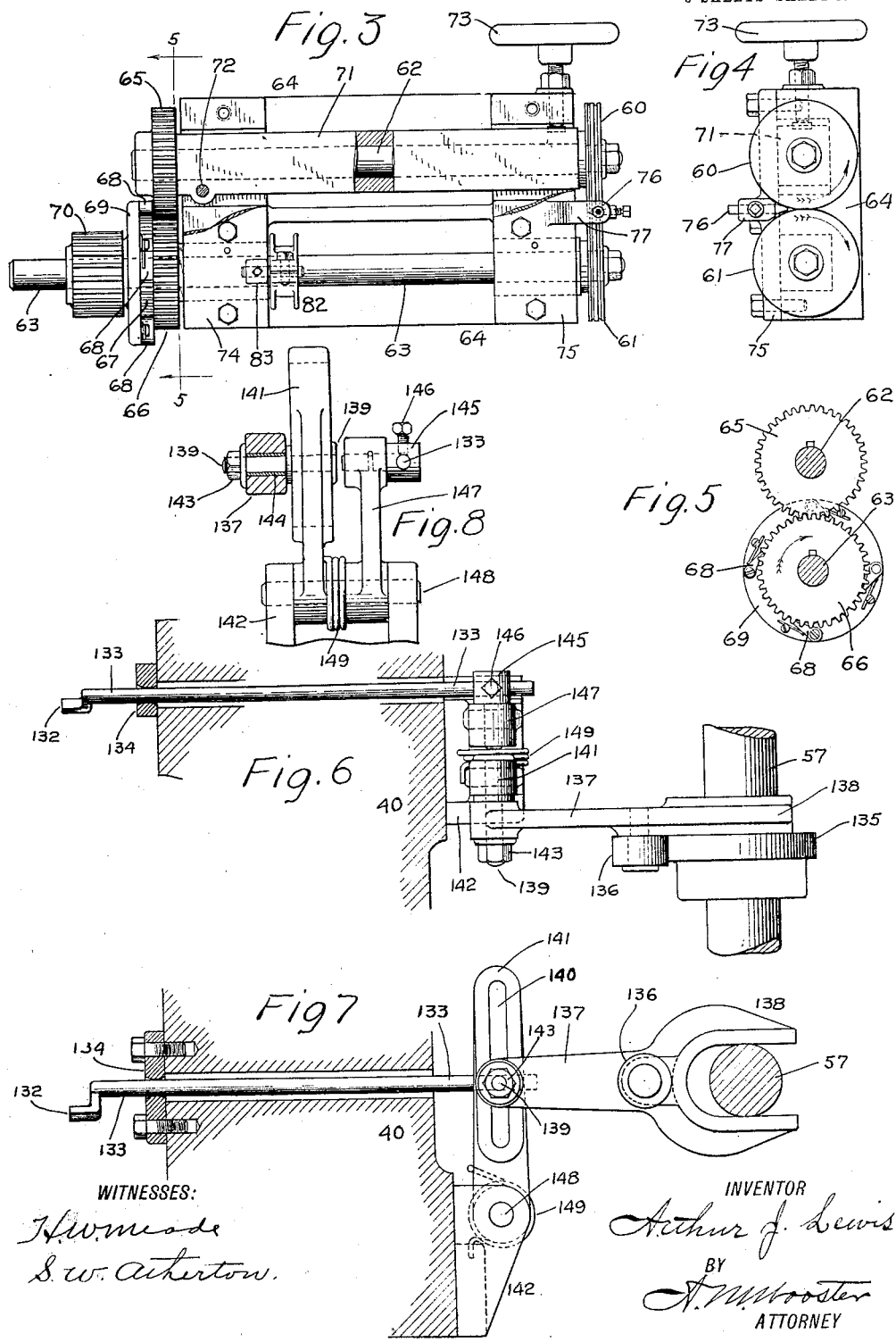

A. J. LEWIS.
MACHINE FOR MAKING COIL SPRINGS.
APPLICATION FILED JAN. 4, 1913.
1,083,501.
Patented Jan. 6, 1914.
8 SHEETS—SHEET 4.
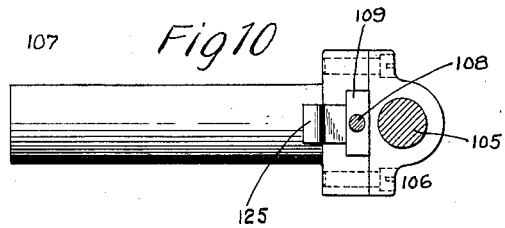
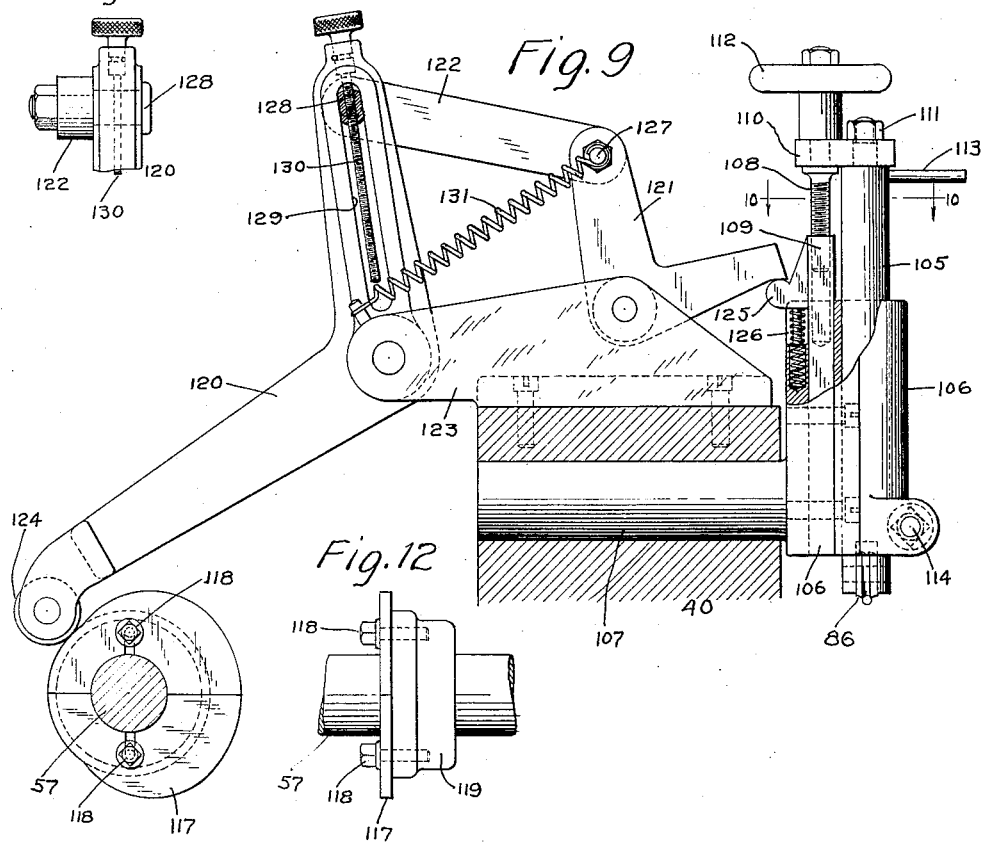
WITNESSES:
H. W. Meade
S. W. Atherton.
INVENTOR
Arthur J. Lewis
BY
A. M. Wooster
ATTORNEY A. J. LEWIS.
MACHINE FOR MAKING COIL SPRINGS.
APPLICATION FILED JAN. 4, 1913
1,083,501.
Patented Jan. 6, 1914.
8 SHEETS—SHEET 5.
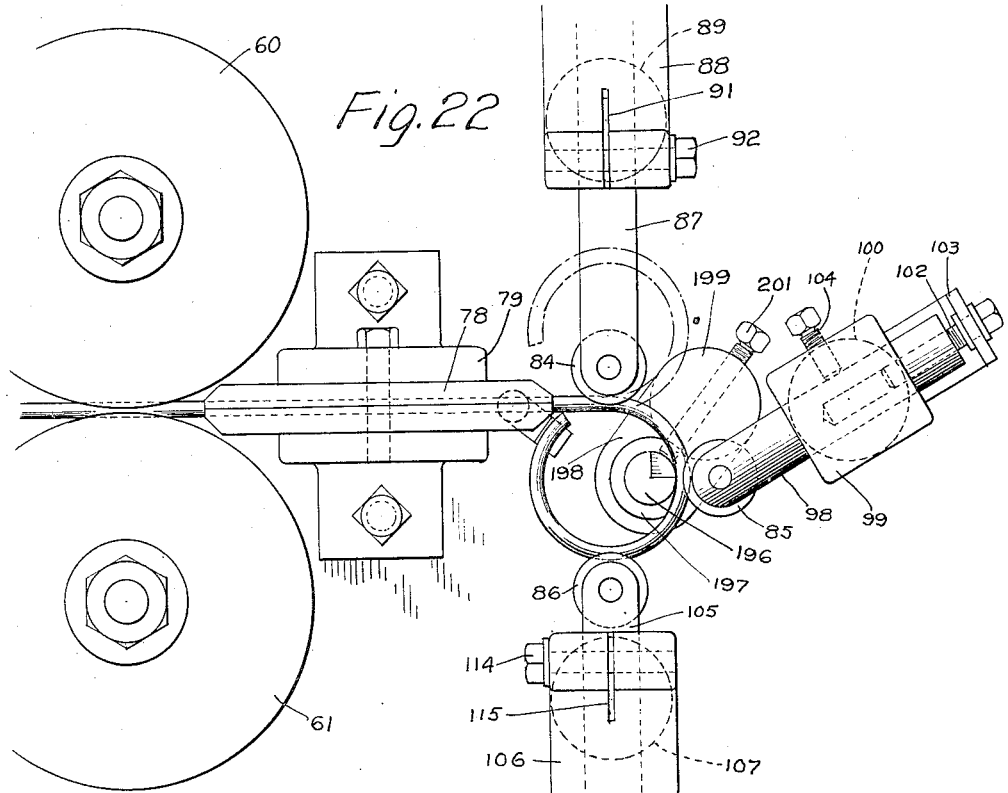
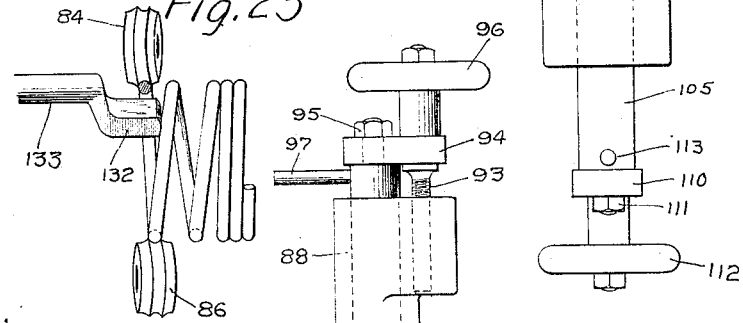
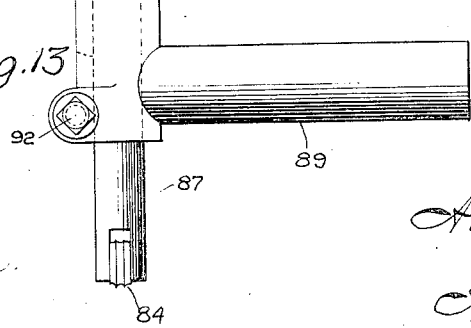
WITNESSES:
INVENTOR
Arthur J. Lewis
BY
ATTORNEY

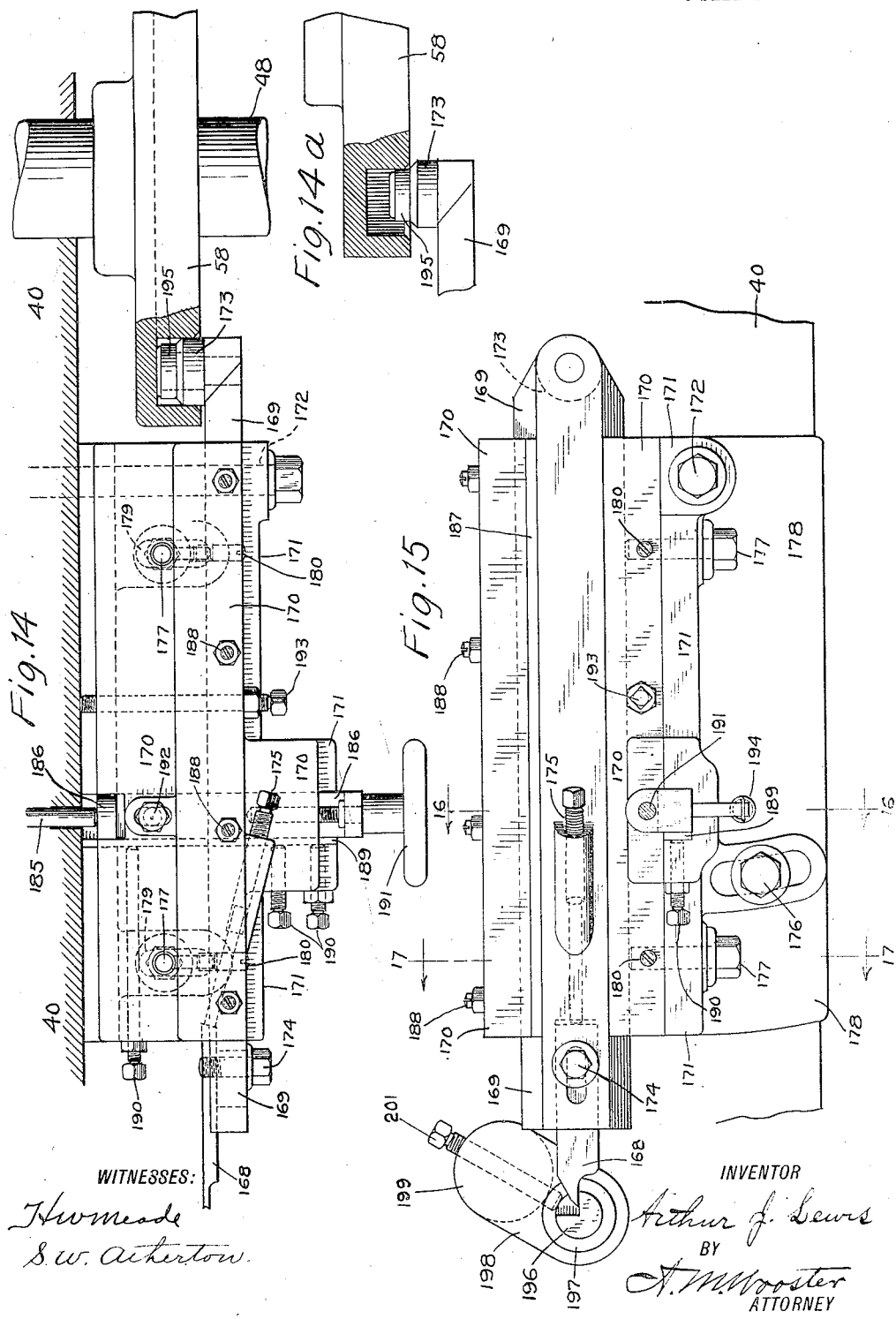

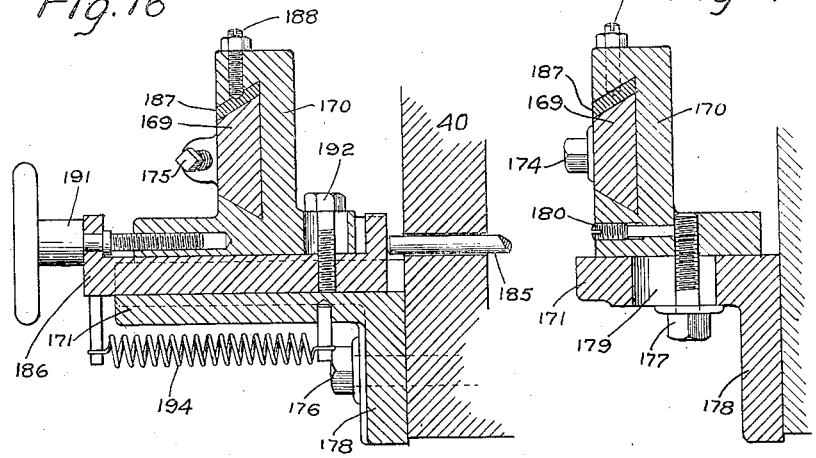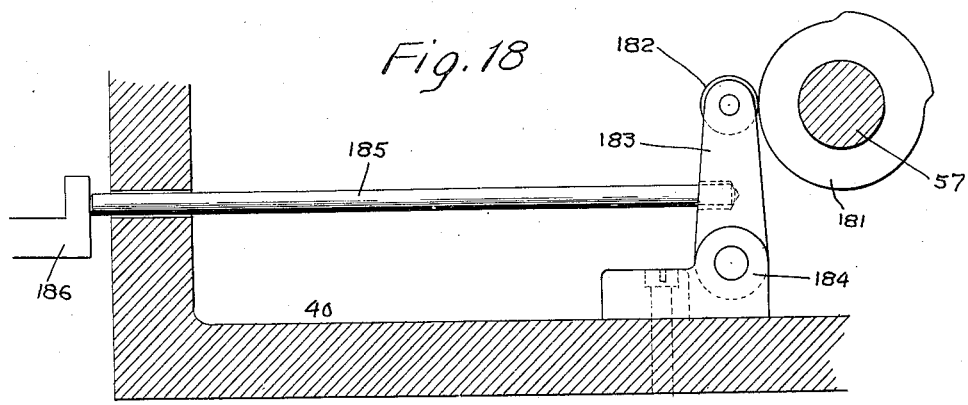

A. J. LEWIS.
MACHINE FOR MAKING COIL SPRINGS.
APPLICATION FILED JAN. 4, 1913.
1,083,501.
Patented Jan. 6, 1914.
8 SHEETS—SHEET 8.
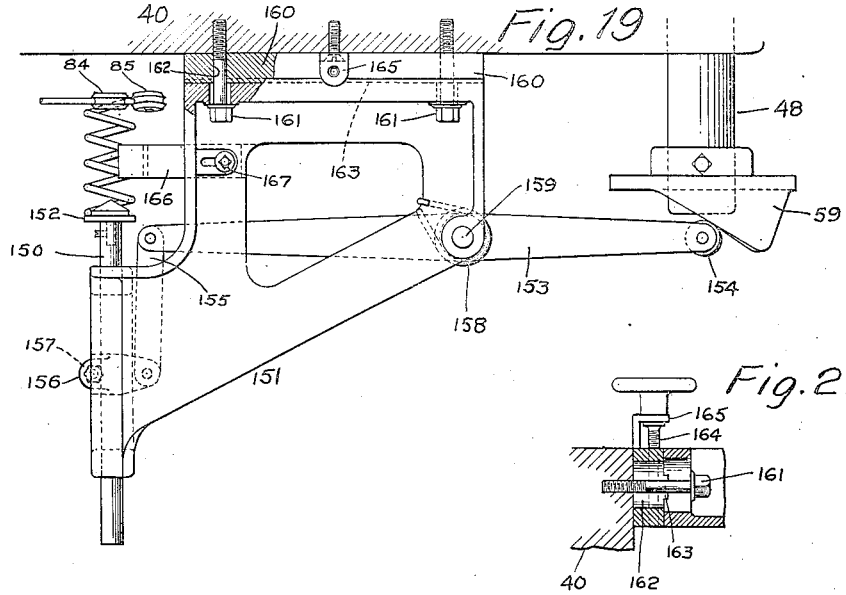
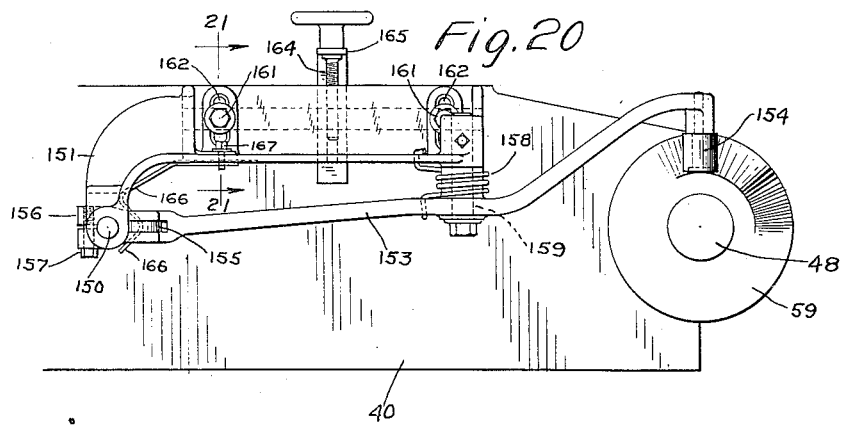
WITNESSES:
H. W. Meade
S. W. Atherton.
INVENTOR
Arthur J. Lewis
BY
A. M. Wooster
ATTORNEY

UNITED STATES PATENT OFFICE.

ARTHUR J. LEWIS, OF STRATFORD, CONNECTICUT, ASSIGNOR TO THE BAIRD MACHINE COMPANY, OF BRIDGEPORT, CONNECTICUT, A CORPORATION OF CONNECTICUT.

MACHINE FOR MAKING COIL-SPRINGS.

1,083,501.  Specification of Letters Patent.  Patented Jan. 6, 1914.

Application filed January 4, 1913. Serial No. 740,118.

*To all whom it may concern:*

Be it known that I, ARTHUR J. LEWIS, a citizen of the United States, residing at Stratford, county of Fairfield, State of Connecticut, have invented an Improvement in Machines for Making Coil-Springs, of which the following is a specification.

This invention has for its object to provide an automatic machine for making coil springs generally; that is, a single machine that will make coil springs of any length, or size, or style from wire of any size within the capacity of the machine. By that I mean, that my novel machine will produce either straight, barrel or cone springs of any required length or size and from wire of any size within the capacity of the machine.

A further object of the invention is to provide in an automatic coil spring making machine what I term an adjustable diameter control; that is, mechanism for regulating the increase or decrease in the diameter of successive coils in the making of barrel, cone and similar springs.

A further object of the invention is to provide in an automatic coil spring making machine what I term an adjustable pitch control; that is, mechanism for regulating the distance of the coils apart in the longitudinal direction of the spring. The diameter control and the pitch control together enable me to produce springs of any of the various styles in use, with coils of uniform diameter or of varying diameter and with the coils lying in contact or at any required distance apart, or partly in contact and partly spaced apart or any required combination of spacing and diameter of successive coils.

A further object of the invention is to provide in an automatic coil spring making machine mechanism for setting each spring before it is cut off.

A further object of the invention is to provide in an automatic coil spring making machine special adjustments and a novel construction of cut-off mechanism.

A further object of the invention is to provide in an automatic coil spring making machine what I term a cut-off control; that is, mechanism adapted to be used in the manufacture of cone and barrel springs, which will automatically shift the position of the cut-off tool in cutting off alternately at the large and small ends of pairs of springs, or if required, will make every alternate movement of the cut-off tool inoperative, as in the making of special springs requiring an amount of wire in excess of the normal maximum length for which the machine is adapted.

With these and other objects in view the invention consists in certain constructions and in certain parts, improvements and combinations which will be hereinafter described and then specifically pointed out in the claims hereunto appended.

Figures 24, 25:
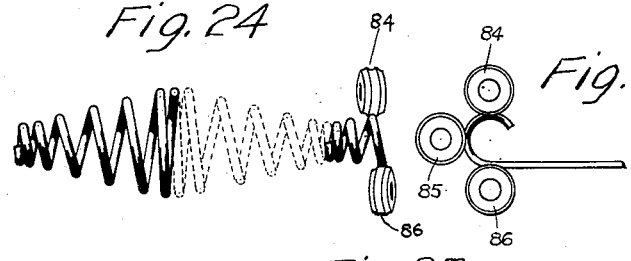
Figure 30:
Figure 26:
Figure 27:
Figure 28:
Figure 29:
Figure 2:
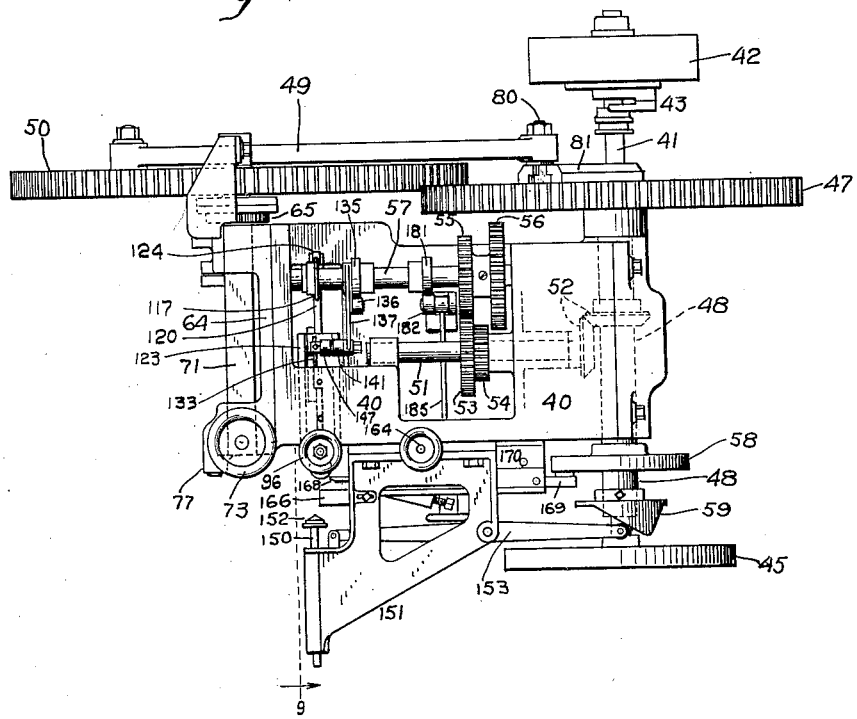

In the accompanying drawings forming a part of this specification, in which similar reference characters indicate the same parts in all of the views, Figure 1 is a front elevation of the machine complete except that the setting attachment is removed; Fig. 2 a plan view corresponding with Fig. 1; Fig. 3 an elevation of the feeding mechanism detached; Fig. 4 an elevation of the feeding mechanism as seen from the right in Fig. 3; Fig. 5 a section on the line 5—5 in Fig. 3, looking in the direction of the arrows; Fig. 6 a plan view of the pitch control or pitch changing mechanism detached; Fig. 7 an elevation corresponding with Fig. 6; Fig. 8 an elevation as seen from the right in Fig. 7, the yoke arm being in section; Fig. 9 a detail elevation of a portion of the diameter control mechanism, the point of view being indicated by the line 9 in Fig. 2; Fig. 10 a plan view of a portion of the mechanism appearing in Fig. 9, certain parts being in section on the line 10—10 in Fig. 9, looking in the direction of the arrows; Fig. 11 a detail elevation as seen from the left in Fig. 9; Fig. 12 an edge view of the operating cam as seen from the right in Fig. 9; Fig. 13 an elevation of one of the members of the diameter control mechanism detached; Fig. 14 a plan view of the cut-off mechanism; Fig. 14ª a detail view corresponding therewith, showing a changed position of the cam roll; Fig. 15 an elevation corresponding with Fig. 14; Fig. 16 a section on the line 16—16 in Fig. 15, looking in the direction of the arrows; Fig. 17 a section on the line 17—17 in Fig. 15, looking in the direction of the arrows; Fig. 18 a detail view illustrating the cut-off control mechanism; Fig. 19 a plan view of the spring-setting mechanism detached; Fig. 20 an elevation corresponding with Fig. 19;

Fig. 21 a section on the line 21—21 in Fig. 20, looking in the direction of the arrows; Fig. 22 a detail view illustrating the operation of coiling a left-hand spring; Fig. 23 a detail side elevation as seen from the left in Fig. 22; Fig. 24 (see Sheet 1) a view illustrating the coiling of a right-hand cone spring; Fig. 25 a view as seen from the right in Fig. 24; Fig. 26 an elevation of a straight coil spring indicating the use of the pitch control mechanism in laying a portion of the coils in contact and the others spaced apart; and Figs. 27, 28, 29 and 30 are views of different styles of springs indicating the adaptability of my novel machine to the production of any style of coil spring that may be required.

40 denotes the framework of the machine which may be of any ordinary or preferred construction and 41 a driving shaft which carries a balance-wheel 45 and to which motion may be imparted in any suitable manner, as by means of a belt (not shown) passing over a pulley 42. This pulley in practice is loose on the shaft and is connected and disconnected by means of suitable clutch mechanism, indicated by 43, which is not illustrated in detail, as specifically it forms no portion of the present invention.

The several mechanisms of the machine are driven from shaft 41 in the manner which I will now describe. 46 (see dotted lines in Fig. 1) denotes a pinion on shaft 41 which meshes with a gear wheel 47 on a shaft 48 which for convenience I will term the main shaft. The feeding mechanism is driven by means of a link 49, one end of which is adjustably connected to gear wheel 47 and the other end to an oscillating segment gear 50. The diameter control, pitch control and cut-off control are all driven by means of an intermediate shaft 51 which receives motion from the main shaft through bevel gears 52 (see dotted lines in Fig. 2). Shaft 51 is provided with gear wheels 53 and 54 adapted to mesh respectively with gear wheels 55 and 56 on a cam shaft 57 to provide two speeds for said shaft, as will presently be fully explained. The cut-off is operated by means of a groove cam 58 on the main shaft and the setting mechanism is operated by means of a face cam 59 on the main shaft.

*The feeding mechanism.*—(See Figs. 1 to 5 inclusive). 60 and 61 denote the feed rolls carried respectively by shafts 62 and 63 mounted on a bracket 64 rigidly secured to the frame work. Shafts 62 and 63 carry intermeshing gear wheels 65 and 66, and shaft 63 carries a ratchet wheel 67 which is engaged by pawls 68 carried by a disk 69 formed integral with or rigidly secured to a pinion 70 which is mounted to rotate on shaft 63 and engages segment gear 50. The feed rolls are shown as provided with corresponding grooves of different size. Should it be required, for example, to make springs from a size of wire too small to be gripped by the right hand grooves as seen in Fig. 3, the rolls would be reversed to place the smaller grooves in operative position. Each of the grooves will take several sizes of wire, it being simply required that the wire be gripped firmly by the rolls. In order to provide a firm grip upon the wire, upper feed roll shaft 62 is journaled in a box 71 which is pivoted to the bracket as at 72. Box 71 and the upper feed roll are forced downward to grip the wire by means of a hand screw 73 in the bracket, the end of which bears upon the box. The bearing blocks for shaft 63 and box 71, carrying shaft 62, are retained in place by cap plates 74 and 75 secured to the bracket. The wire passes to the feed rolls through a guide 76 carried by an arm 77 extending from cap plate 75, the guide being shown as locked in position by a set screw. After leaving the feed rolls the wire passes through a guide 78 carried by a bracket 79 and shown as secured in place by set screws.

An important feature of the present invention is that without regard to the length, shape or diameter of the springs that are to be formed, I determine the length of wire allowed for each spring, wholly independently of the cutting-off mechanism, by a simple adjustment of the feeding mechanism. Link 49 by which the segment gear is oscillated is connected to gear wheel 47 on the main shaft by means of a stud 80 which turns in the link and is provided with a T-head engaging a correspondingly shaped groove in an enlargement 81 of one of the spokes of the gear wheel. It will be obvious that the position of the stud with relation to the axis of the gear wheel determines the amount of oscillation of the segment gear, and that the amount of this oscillation determines the length of wire drawn in by the feed rolls, it being understood of course that the segment gear makes a complete oscillation in unison with the rotation of the main shaft. As shown in Figs. 1 and 2, stud 80 is adjusted at the extreme of its outward movement to produce the maximum length of wire. Should less wire be required, the accurate feeding of any desired length may be produced by moving the stud inward toward the axis of the gear wheel. The operation of the feeding mechanism will be obvious from Figs. 1 to 5 inclusive. When segment gear 50 is moving toward the left, as seen in Fig. 1, pawls 68 will engage ratchet 67 and will impart rotary movement to gear wheels 65 and 66, the feed roll shafts and the feed rolls, and when the segment gear is moving toward the right, as seen in Fig. 1, the pawls will slip over the teeth of the ratchet. In order to prevent the possibility of the feed rolls continuing to move forward by momentum after the forward movement of the segment gear has stopped, when the machine is working upon light wire, and likewise to prevent the possibility of backward movement of the feed rolls through reaction of the wire when the machine is working upon heavy wire, I provide a friction device on feed roll shaft 63 which is indicated as a whole by 82. This friction consists of clamping arms inclosing feed roll shaft 63 and drawn together by a set screw, the arms being retained against rotation with the shaft by a pin passing between them and engaging a lug 83 on cap plate 74.

*The diameter control.*—From guide 78 the wire passes to the coiling rolls indicated specifically by 84, 85 and 86. Coiling roll 84 is carried by a slide 87 which is adapted to be moved longitudinally in a holder 88 having a shank 89 which engages a socket in the frame work and is locked in place by a set screw 90 (see Fig. 1). The inner end of the holder is provided with a longitudinal slot 91 and the sides are clamped together to lock slide 87 in place by a cap screw 92. The slide is adjusted longitudinally in the holder by means of a screw 93 which engages the holder and rotates without threaded engagement in a plate 94 through which a reduced end of the slide passes, said reduced end being threaded and engaged by a nut 95. The screw is provided with a hand wheel 96 and the slide is provided with a projecting pin 97 for convenience in manipulation. It will of course be obvious that the three coiling rolls must each be adjusted with relation to the others. For the present, however, I will simply describe the three adjustments of coiling roll 84. First adjustment:—The diameter of the coils is determined by the longitudinal adjustment of the slide. To increase or diminish the diameter of the coils, cap screw 92 is loosened and the slide is moved in or out by rotation of screw 93 and after adjustment is locked in position by tightening up the cap screw. Second adjustment:—It will necessarily follow that if the diameter of the coils is materially changed, the position of the coiling roll with relation to the center of the coil must be changed more or less to correspond. That is to say, a certain relation must be maintained between the diameter of the coils and the position of the coiling roll with relation to the center of the coils. This adjustment is effected by loosening set screw 90 and rotating the holder on the axis of shank 89, the holder being locked in place after adjustment by tightening up the set screw again. The third adjustment of said coiling roll has relation to the pitch of the coils of the spring that is being formed, but does not control their pitch, said adjustment merely placing the coiling roll in accurate relation to the pitch, which is determined by the pitch control, presently to be described. The adjustment is effected by loosening both cap screw 92 and nut 95 and rotating slide 87 in the holder, in either direction, as may be required, by means of pin 97, the slide being then locked in place by tightening up the cap screw and nut.

Coiling roll 85 is carried by a slide 98 which is adapted to be moved longitudinally in a holder 99 having a shank 100 appearing in dotted lines only but corresponding with shank 89 of holder 88. This shank engages a socket in the frame work and is locked in place by a set screw 101 (see Fig. 1). Coiling roll 85 has the same adjustments as roll 84 and in practice an additional adjustment. First adjustment:—The slide is adjusted longitudinally in the holder to determine the diameter of the coils by means of a screw 102 which has threaded engagement with the slide and is held against longitudinal movement, but free to rotate, in a bracket 103 which is cast integral with or rigidly secured to the holder. Rotation of screw 102 will move the slide longitudinally in the holder, leaving the slide and screw free to rotate together, however. Second adjustment:—The adjustment to determine the position of the roll with relation to the center of the coils is effected by loosening set screw 101 (see Fig. 1) and rotating the holder on the axis of shank 100 (appearing only in dotted lines in Fig. 22) in the same manner that roll 84 and holder 88 are rotated. Third adjustment:—In order to adjust the position of the roll with relation to the pitch of the coils, the slide is rotated in the holder, as may be required, and then locked to the holder by means of a set screw 104. Fourth adjustment:—This adjustment is merely an addition to the second adjustment of said coiling roll 85, for the purpose of changing the plane of the roll to correspond with changes in the plane of the wire engaged thereby as it is formed into a coil. In working upon fine wire the change in the plane of the rolls is but slight, the heavier the wire the farther outward successively rolls 85 and 86 will require to be adjusted. As already explained, upon loosening set screw 101, shank 100 carrying holder 99 will be free to rotate in its socket in the frame work. It will likewise be free to be moved outward longitudinally in the socket. Having drawn holder 99 outward as far as may be required to place roll 85 in its operative plane, care being taken at the same time to maintain the second adjustment, the roll, holder and shank are locked in place by tightening up set screw 101.

Coiling roll 86 is carried by a slide 105 which is adapted to be moved longitudinally in a two-part holder 106 having a shank 107 (see Fig. 9) which engages a socket in the frame work in the same manner as shanks 89 and 100, and is locked in place by a set screw 116 (see Fig. 1). Roll 86 has the same four adjustments as roll 85, and in addition thereto a cam control which is used upon all springs of changing diameters. First adjustment:—Slide 105 is adjusted longitudinally in the holder by means of a screw 108 which has threaded engagement with a second slide 109 lying parallel with slide 105 in the holder. The screw rotates without threaded engagement in a plate 110 through which a reduced end of slide 105 passes, said reduced end being threaded and engaged by a nut 111. The screw is provided with a hand wheel 112 and slide 105 is provided with a projecting pin 113 for convenience in manipulation. To increase or diminish the diameter of the coils, slide 105 is moved in either direction, as may be required, by manipulation of the hand wheel. The holder is provided at its inner end with a longitudinal slot 115 and a cap screw 114 clamps the sides together to lock the slide in operative position. Second adjustment:—This adjustment determines the position of the roll with relation to the center of the coil and is effected by loosening set screw 116 (see Fig. 1) and rotating the holder on the axis of shank 107 (see Fig. 9) in the same manner that rolls 84 and 85 and their holders are rotated, the set screw being then tightened up to lock the parts in place. Third adjustment:—In order to adjust the position of the roll with relation to the pitch of the coils, nut 111 is loosened and slide 105 is rotated in the holder, as may be required, by means of handle 113 and then locked in place by tightening up the nut again. Fourth adjustment:—This adjustment, as is the case of roll 85, is merely an addition to the second adjustment and is made for the purpose of changing the plane of the roll to correspond with changes in the plane of the wire engaged thereby as it is formed into a coil. The adjustment is effected by moving shank 107 inward or outward in its socket, as may be required, set screw 116 having been loosened, after which the set screw is tightened up, care being taken at the same time to maintain the second adjustment.

*The cam control of coiling roll 86.*—It will be understood that all of the adjustments of coiling rolls 84, 85 and 86 heretofore described have relation only to the making of straight springs. In order to provide for the making of cone, barrel and other springs in which the coils progressively increase or diminish in diameter, I have provided automatic means for varying the diameters of the coils in any style of spring that may be required. This mechanism is operated from a cam 117 on shaft 57. It will of course be understood that a new cam is required whenever the style of spring is changed. Provided the style is not changed, however, longer or shorter springs or springs having greater or lesser minimum and maximum diameter or made from larger or smaller wire may be produced by the same cam through the use of an adjustment presently to be described. Change of style as I have used the words is intended to mean an increase or decrease in the relative difference between the diameters of successive coils. In order to provide for convenient changes in cams, when required, I have shown a divided cam, each part being provided with a slot to receive a cap screw 118 engaging a collar 119 which is rigidly secured to the shaft. As already explained, the diameter of the coils produced is determined by the position of the coiling rolls, more especially the position of coiling roll 86, it being only necessary to reciprocate this roll toward or from the center of the coils to produce any required progressive changes in the diameter of the coils. As already explained, in the making of straight springs, cap screw 114 is tightened up, thereby locking slides 105 and 109 to the holder. In the making of barrel, cone and similar springs, in order to permit free reciprocation of the slides, cap screw 114 is loosened. This leaves the slides to be controlled through the cam by means of bell-crank levers 120 and 121 and a link 122 connecting said bell-crank levers. Both bell-crank levers are pivoted to a bracket 123 rigidly secured to the frame work. One arm of bell-crank lever 120 carries a roll 124 which engages the periphery of the cam and one arm of bell-crank lever 121 is adapted to engage slide 109. I have shown the slide as provided with a rounded lug 125 upon which the arm of the lever bears. The slides, which it must be understood move as one, are held in the raised position, with the rounded lug bearing against an arm of bell-crank lever 121, by means of a spring 126, one end of which is socketed in holder 106, the other end being supported by a pin extending from the rounded lug. Link 122 is connected to bell-crank lever 121 by means of a pivot pin 127, the other end of said link being pivoted on a stud 128, the shank of which is adapted to slide in a slot 129 in an arm I will define as the second arm of bell-crank lever 120. The adjustment of this stud is effected by means of a screw 130 which is mounted to rotate without threaded engagement in the end of the arm and has threaded engagement with the stud (see Figs. 9 and 11). Roll 124 is retained in engagement with the cam by means of a spring 131, one end of which is connected to pivot pin 127 and the other end to the inner end of bracket 123. The adjustability of stud 128 enables me to make various sizes and lengths of cone and barrel springs and to use different sizes of wire without changing the cam, provided, of course, that the style of the spring is not changed.

If it is desired to produce springs of greater minimum and maximum diameter than the machine has been producing, adjusting screw 130 will be rotated to move stud 128 outward in the slot. If springs of less minimum and maximum diameter (without change of style) are required, the stud will be moved inward in the slot. The effect in brief of this adjustment is to increase or diminish the reciprocation of the slide, wholly independently of the action of the cam.

It will be obvious that in changing the machine from right to left hand springs and vice versa, the functions of rolls 84 and 86 will be reversed. As shown in full lines in Fig. 22, the coiling rolls are set to produce left hand springs. In the making of right hand springs, the wire would first contact with roll 86 and the most important part of the work would be performed by roll 84. In the making of either right or left hand straight springs all that is required is to properly adjust rolls 84, 85 and 86 in the manner already described. In the making of barrel, cone and similar springs, however, in changing from left to right hand springs or vice versa, the first and third holders, slides and rolls are transposed bodily; that is to say, roll 86, slide 105 and holder 106, as seen in Fig. 22, are changed to the position occupied by roll 84, slide 87 and holder 88. Bracket 123 and the bell-crank levers and link carried thereby are also shifted on the frame work to correspond with the changed position of holder 106 and the parts carried thereby. In Fig. 22, roll 86 and its holder are in position for making left hand springs and in Fig. 9 they are in position for making right hand springs. In Fig. 22 the bracket does not show, but its position would necessarily be inverted from that in Fig. 9.

*Pitch control mechanism.*—(See Figs. 6, 7, 8 and 23.) The term pitch control in the sense of this specification means mechanism for regulating the distance apart of the coils in the longitudinal direction of the spring; that is, this mechanism determines whether the coils shall lie in contact with each other, or spaced apart and how far apart, or whether in portions of the spring the coils lie in contact and in other portions spaced apart. The desired result is effected by means of a pusher 132 carried by a rod 133 which is adapted to reciprocate freely in a hole in the frame work, the outer end of said rod passing through a guide plate 134 which retains it in alinement but permits lateral movement of the inner end of the rod. The pusher is actuated from a cam 135 on shaft 57. This cam is engaged by a roll 136 carried by an arm 137 carrying at its inner end a yoke 138 which straddles the shaft and retains the arm in operative position. The outer end of arm 137 is pivoted on a stud 139 which is adjustable in a slot 140 in an arm 141 pivoted to a bracket 142 secured to the frame work. The stud is adjusted in the slot to increase or diminish the throw of the pusher, and is locked in place after adjustment by a nut 143 which bears against a sleeve 144 in a head at the outer end of the arm. The inner end of rod 133 engages the head of a stud 145, passing through a hole in said head and being locked in position by a set screw 146. The stud is free to rotate in the head of an arm 147 which is pivoted to bracket 142. Arms 141 and 147 may be cast independent and secured together but are preferably cast integral, as shown, and oscillate on a pin 148 in the bracket. A spring 149 coiled about the hub of the arms and having one end connected to the bracket and the other bearing against one of the arms, acts to retain the roll in close engagement with the cam. It will be noted (see Fig. 23) that the operative face of the pusher is made convex in order to reduce the bearing surface upon wire. In practice the pusher is made broad enough to enable it to act upon coils of varying diameter and is changed when required. The adjustment of the outer end of arm 137 in the slot in arm 141 determines the amount the coils are separated from each other; that is, the spread of the coils, it being understood that the pusher bears upon a coil already formed and imparts a permanent bend to the wire, separating the coil against which it bears the required amount from the coil that is being formed. Where the style of spring is changed, that is, where the pusher is required to operate on part only of a spring or in another portion of the spring, as for example in changing from the style of spring illustrated in Fig. 26 to the style illustrated in either Figs. 29 or 30, a change of cams is required, it being understood of course that the cam must be accurately laid out to produce the desired result.

*The setting mechanism.*—It is of course well understood that in the manufacture of all compression springs for accurate work, the springs are formed to a greater than their normal length and require to be set, as it is termed, before they are ready for use; that is, the spring must receive what is termed an initial set or compression. This operation is ordinarily performed independently of the making of the spring, as by a manually operated arbor press. In my present machine I do away with this additional operation and set each spring before it is cut off. This operation is performed by the mechanism illustrated in Figs. 19, 20 and 21.

150 denotes the setting plunger which is adapted to reciprocate in a bracket 151 which is adjustably secured to the frame work, as will presently be described. The plunger is provided with a detachable head 152 which is suitably shaped to pass within and also to support circumferentially the outer coil of the spring and is changed when required. The plunger is reciprocated by means of a lever 153 which is pivoted to the bracket, as at 159, and is provided at one end with a roll 154 which engages the face of cam 59 on shaft 48.

155 denotes a link, one end of which is pivoted to the lever and the other to a clamp 156 which adjustably engages the plunger and is locked in position after adjustment by a cap screw 157. The roll is retained in engagement with the cam by means of a spring 158, one end of which engages the lever and the other end the bracket.

In order to provide for the necessary adjustments in changing from large to small springs and vice versa, or in making the change from right hand to left hand springs and vice versa, I interpose a plate 160 between the base of the bracket and the frame work and secure both bracket and plate to the frame work by means of cap screws 161 which pass through elongated slots 162 in the base of the bracket and the plate and engage the frame work. It will be noted (see Fig. 19) that the slots in the bracket base are considerably wider than the screws. This is in order to permit longitudinal movement of the bracket toward and from the axial line of the spring. In order to retain the bracket and plate in perfect alinement I provide one of said parts with a rib 163 (see Fig. 21) which engages a corresponding groove in the other part. The bracket and plate are moved together in changing from right to left hand springs, or vice versa, by means of a screw 164 which is mounted to rotate without threaded engagement in a bracket 165 rigidly secured to the frame work. This screw has threaded engagement with the plate and will move the plate and bracket vertically any required distance within the limit of slots 162.

In use, the adjustment of the setting plunger is determined by the point of attachment of link 155 thereto by means of the clamp. During the setting operation, the attached end of the spring is supported by the coiling rolls. It should be understood that after the formation of each spring the feeding mechanism stops, at which instant the setting operation takes place, and after that the operation of the cut-off mechanism, presently to be described. Should it be required, an additional support for the attached end of the spring may be attached to the cut-off die, presently to be described. I have found, however, that it is unnecessary as the spring is securely held by the coiling rolls. It will be obvious that the bracket carrying the plunger should be so adjusted as to place the axis of the plunger in approximate alinement with the axis of the spring to be operated upon. As there is always more or less of a tendency of the spring to buckle in the setting operation, said tendency varying of course with the style and length of the spring, the bracket is ordinarily adjusted in the manner just described, so as to place the axial line of the plunger parallel with but slightly outside the axial line of the spring, the effect of which is to render it impossible for the spring to buckle outward when subjected to the action of the setting plunger and to impart to the spring a tendency to buckle inward.

In order to furnish the necessary backing for the spring I provide a supporting plate 166 which is suitably shaped to partly inclose the spring and is adjustably secured to the bracket by means of a cap screw 167 which passes through a slot in the bracket and engages the plate. A recess may be provided in the bracket to receive the plate, as indicated by dotted lines in Figs. 19 and 20. The supporting plate may be adjusted inward or outward to correspond with changes in the size or style of springs by loosening the cap screw and then shifting the plate, as may be required, and locking it in place by tightening up the cap screw again.

*The cut-off mechanism.*—(See Figs. 1, 14, 15, 16 and 17.) The cut-off tool 168 is adjustably secured to a slide 169 adapted to reciprocate in a holder 170 adjustably secured to a table 171 which is provided with an angle flange 178 by which it is pivoted to the frame work, as at 172. The slide is preferably dovetail in form, as shown.

187 is a gib controlled by set screws 188 to take up lost motion. At the rear end of the slide is a roll 173, (shown in the present instance as stepped, for a purpose presently to be explained) which engages the groove of cam 58 on shaft 48, whereby the slide is actuated to perform the cutting-off operation.

196 denotes a cut-off die which lies within the coils and coöperates with the cut-off tool in the cutting-off operation. The shank of this die is axially adjustable, in order to place the edge in proper relation to the tool, in a hub 197 on an arm 198 having a shank 199 which engages a socket in the frame work, in the same manner as shanks 89, 100 and 107. This adjustment adapts the die to different sizes and to right and left winds of springs. Shank 199 is locked in place by a set screw 200 (see Fig. 1) and the die is locked by a set screw 201 engaging its shank. The base of the tool is received in a socket in the slide and is locked in place by a cap screw 174 which passes through a slot in the slide and engages the tool. The tool may be adjusted longitudinally with relation to the slide by means of a screw 175 which bears in the usual manner against a pin (shown only in dotted lines) which in turn engages the end of the tool shank. It will of course be obvious that in order to attain the best results, the movement of the cut-off tool must be toward the axis of the spring. The necessary adjustment of the tool to provide for changes in the sizes of springs and changes from right to left hand springs and vice versa is effected by swinging table 171, carrying the holder and slide, on its pivot. The table is locked in place after adjustment by a cap screw 176 passing through a slot in the angle flange and engaging the frame work. Another and very important adjustment is provided in order to determine the point of operation of the cut-off tool, as in changing from one length of spring or pitch of coils to another. This adjustment is effected by moving holder 170, carrying the slide, transversely relatively to the table. The holder is locked to the table by means of cap screws 177 which pass through slots 179 in the table and engage the holder (see Fig. 17). These cap screws are shown as locked by set screws 180, for a purpose presently to be explained.

*The cut-off control.*—This mechanism is brought into use in the making of cone springs and also in the making of special springs requiring an amount of wire in excess of the normal maximum length for which the machine is adapted. As regards cone springs, it is obvious that if they were made with the small end of one spring following the large end of another spring, or vice versa, there would be quite a length of wire wasted between the large end coil of one spring and the small end coil of the next spring. This length of wire is useless for either spring. If it is cut in two in the middle it leaves an end to be removed from each spring in order to complete it, or if cut at either end it leaves a longer end to be removed from one of the springs. In order to wholly avoid this difficulty and to produce finished cone springs automatically, I make the springs in the form of a double cone and perform the cutting operation alternately at the large end of two springs and at the small end of two springs, or, expressed otherwise, cone springs are formed alternately with the large end first and the small end first. This necessitates a cutting operation to separate the large ends of two springs followed by a cutting operation to separate the small ends of two springs and calls for the use of my novel cut-off control. As regards special springs requiring an extra length of wire, it should be understood that the machine is normally adapted to coil a maximum length of wire into a spring of any size or style. This length of wire I term the normal maximum of the machine. Suppose, for example, that the normal maximum is sixty inches and that special springs are called for requiring a greater length of wire than sixty inches. This I have provided for in the present machine to the extent of doubling the normal maximum; that is to say, provision is made for the manufacture of springs of extra length to the extent of a spring requiring one hundred and twenty inches of wire. This condition also calls for the use of my novel cut-off control. Turning now to Figs. 14 to 18, inclusive, it has already been explained that when cap screws 177 have been loosened, the holder, slide and cut-off tool may be moved toward or from the framework to change the point of operation of the tool, as in changing from one length of spring to another. The cut-off control causes this change of position of the holder, slide and tool to be made automatically. Having loosened screws 177 sufficiently to leave the holder free to move, the screws are locked in the loosened position by set screws 180. The automatic movement of the holder and slide is produced by means of a cam 181 on shaft 57 which engages a roll 182 on an arm 183 pivoted to a bracket 184 secured to the framework. This arm is adapted to actuate a controlling rod 185, one end of which is socketed in the arm, the other end passing through the framework to operate the holder.

193 denotes a stop screw which passes transversely through the holder and bears against the framework to limit the movement of the holder, slide 169 and the tool toward the framework, and 186 a transverse slide with which the controlling rod contacts and which is adapted to be adjusted relatively to the holder. The slide is socketed partly in the table and partly in the holder, as will be understood from Figs. 14, 15 and 16, both table and holder being provided with lateral extensions to give additional support to the slide. The portion of the socket in the table is made wider than the slide to receive a gib 189 which is controlled to take up lost motion and to compensate for wear by set screws 190. The adjustment of the transverse slide with relation to the holder is determined by a screw 191 which is mounted to rotate without threaded engagement in the outer end of the transverse slide and has threaded engagement with the lateral extension of the holder. The holder and transverse slide are rigidly locked together after adjustment by a cap screw 192 which passes through a slot in the holder and engages the slide. 194 denotes a spring, one end of which is connected to the transverse slide and the other to the table, the action of which is to pull the transverse slide, carrying with it the holder, slide 169 and the cut-off tool, inward until stop screw 193 contacts with the framework. The inner point of operation of the cut-off tool (that is the position nearest the framework) is determined by adjustment of stop screw 193. Turning said screw inward forces the holder and the parts carried thereby outward from the framework against the power of spring 194 and turning the screw outward allows the spring to pull the holder and the parts carried thereby toward the framework. After this adjustment the stop screw is locked in position by means of a set nut.

To determine the outer point of operation of the cut-off tool (that is the position farthest from the framework) the high portion of cam 181 on shaft 57 is first caused to engage roll 182 on arm 183 causing controlling rod 185 to be carried to the limit of its outward movement, as will be best understood by referring to Fig. 18. Cap screw 192 is now loosened and screw 191 is turned in or out as the case may be, to adjust the holder, slide and cut-off tool, it being understood of course that the inner end of transverse slide 186 is held against the end of the controlling rod by spring 194. Bearing this in mind, it will readily be seen that rotation of screw 191 will cause the holder and the parts carried thereby to be moved in or out, as may be, to the desired position. Cap screw 192 is then tightened up to lock the holder to the transverse slide. Should it be required to utilize the full throw of the cam it is simply necessary to turn screw 191 inward far enough to cause the holder to move outward a distance equal to the throw of the cam, the effect of which is to move the operative part of stepped roll 173 on slide 169 out of engagement with the groove in cam 58, causing one revolution of the cam to be abortive as will presently be explained. This adjustment of screw 191 will cause the end of the stop screw to be carried away from the framework an amount equal to the change in position of the cut-off point and when the low portion of the cam 181 is placed in engagement with the roll on arm 183 the holder will be moved by the spring to its inner position as determined by the stop screw. The cam remains unchanged under all circumstances, the position of the high part being located to operate just before the cut-off operation takes place. Turning now to Fig. 2, it will be noted that intermediate shaft 51 carries gear wheels 53 and 54 which differ in diameter. Gear wheel 53 normally meshes with gear wheel 55 on cam shaft 57 and imparts to said shaft its normal movement. Under certain conditions, however, as in the making of springs requiring an extra length of wire or in making cone springs in pairs as already described, it is desirable to reduce the speed of the cam shaft and the mechanisms driven therefrom with relation to the other mechanisms of the machine. This is effected by loosening gear wheels 55 and 56 (which are shown as carried by a single hub) and moving gear wheel 55 out of engagement with gear wheel 53 on the intermediate shaft, and moving gear wheel 56 into engagement with gear wheel 54 on said shaft. Gear wheels 53 and 55 are shown as having an equal number of teeth, while gear wheel 56 has double the number of teeth of gear wheel 54, so that the change from an intermeshing of 53 and 55 to an intermeshing of 54 and 56 reduces the speed of the cam shaft one-half. In other words, instead of a one to one relation between the three mechanisms operated from the cam shaft and the other mechanisms of the machine, the change described above establishes a one to two relation. The same principle would apply should a one to three relation be desired, the only changes required being in the sizes of gear wheels 54 and 56.

It has been explained that the length of wire fed at each actuation of the machine is determined by the adjustment of the pivotal point of link 49 on gear wheel 47. This determines the throw of segment gear 50 and consequently the amount of wire drawn in by the feed rolls. Sixty inches of wire has also been arbitrarily fixed upon as the normal maximum length that the machine is adapted to manipulate. Starting from this basis it is obvious that to feed any required length of wire less than sixty inches it is merely necessary to move the pivot of link 49 inward on gear wheel 47. In order, however, to provide for the making by this machine of springs requiring an amount of wire in excess of the normal maximum and for the making of cone springs in pairs I have provided the means just described for reducing the speed of the cam shaft which actuates the diameter control, the pitch control and the cut-off control, and have especially provided the cut-off control. Suppose now that it is required to make a straight spring requiring a length of wire in excess of the normal maximum; gear wheel 56 on the cam shaft is placed in engagement with gear wheel 54 on the intermediate shaft, the effect of which is to produce but one rotation of the cam shaft coincidently with two complete revolutions of the main shaft and consequently two actuations of the feeding mechanism to each actuation of the three controlling mechanisms actuated from the cam shaft. The next step is to so adjust link 49 upon gear wheel 47 as to cause each actuation of the segment gear to feed one-half the length of wire required for the spring. For example, if the spring required seventy inches of wire, link 49 would be adjusted to produce a feed of thirty-five inches at each actuation of the machine. In practice the first feeding operation would take place and the formation of the first half of the spring, then the second feeding operation, followed by the completion of the spring at which instant the cut-off tool would operate. It is the operation of the cut-off control that prevents the cutting off of the half-finished spring. In other words, it is required that each alternate operation of the cut-off tool be dispensed with or rendered abortive. For this purpose transverse slide 186 is adjusted relatively to holder 170, as previously explained, so as to utilize the full throw of cam 181, the high portion of said cam acting on controlling rod 185, at the instant the first feeding operation stops and the cutting off operation would normally take place, to cause said rod to move the transverse slide, holder and parts carried thereby outward. The effect of this movement is to carry the operative portion of roll 173 out of the groove in cam 58 leaving the stepped portion only of said roll, specifically indicated by 195, in engagement with said groove, (see Fig. 14ª) so that although slide 169 carrying the cut-off tool receives a partial actuation from cam 58 it is abortive and accomplishes no result whatever. At the next actuation of the cut-off mechanism, which will be after the second feeding operation, and after the formation of the second portion of a spring, the low portion of cam 181 will be in engagement with arm 183 and the controlling rod will not be affected thereby, leaving the cut-off to operate in its usual manner. I thus form a spring requiring an extra amount of wire by two actuations of the machine instead of one and provide for cutting it off when completed.

Another and vitally important use of the cut-off control is in the manufacture of cone springs. These are made, as already explained, successively large end to large end and small end to small end. The machine is adjusted, as just described, to produce one actuation of shaft 57 and the three controlling mechanisms coincidently with two actuations of the feeding mechanism. The diameter control and pitch control are adjusted to produce two cone springs as one spring, the first cone having progressively increasing coils and the second progressively diminishing coils, and the cut-off control is adjusted to cause the cutting off of each cone just after the formation of a new cone has commenced, the cut-off tool acting to cut off cones alternately at the greatest diameter and at the smallest diameter. The forming and cutting off of cone springs is diagrammatically illustrated in Fig. 24. The formation of springs, as indicated, is from right to left. An entire double cone comprising two springs is illustrated, also the first coils of a third spring. The first spring, the one toward the left, is shown in full lines and was cut off at the middle of the coil of greatest diameter. The second spring is shown in dotted lines and was cut off at the middle of the smallest coil. It will be remembered that the feeding mechanism stops after each actuation, that is, during the return movement of segment gear 50. The mechanisms are so timed, however, that this stoppage of the feed does not take place at the end of a spring but after one or more coils of a new spring are formed, as clearly shown at the right in Fig. 24. In other words, the amount of wire fed at each actuation in the making of cone springs completes a partly formed spring and forms one or more coils of a new spring before the feeding movement stops. At this instant the setting operation takes place, followed by the cutting off operation.

It will be understood that the portion of the new spring that is formed is not any special number of coils but so much of the spring as can be formed from the amount of wire fed that is not used in making the last previous spring. It follows therefore that this arbitrary amount of wire will make more coils when the small end of the spring is formed first than when the large end is formed first. Remembering therefore that the cutting-off operation must take place alternately at the middle of the largest coil and the middle of the smallest coil, it follows that the position of the holder and cut-off tool must be moved slightly toward or from the coiling rolls in making the alternate large diameter and small diameter cuts in order to compensate for the change in distance from the coiling rolls at which alternate cuts must be made. This novel result is produced by the cut-off control. The present requirement does not bring stepped portion 195 of roll 173 into use but merely moves said roll inward or outward more or less, as may be required, in the groove of cam 58. For this purpose transverse slide 186 is adjusted relatively to the holder as previously explained. When the low portion of the cam 181 is in engagement with arm 183 there will be no movement of the controlling rod and slide 186 and consequently no lateral movement of the holder and cut-off tool which when moved forward by cam 58 will make the cut at the middle of the largest coil. Before the next cut-off movement, however, the fixed amount of wire in excess of the completed spring, which goes into a new spring, will have been formed into small coils instead of large coils. It follows, therefore that the cut-off operation must be made at a slightly greater distance from the coiling rolls than a cut-off operation which separates the large ends of two springs. This is effected by the high portion of cam 181 which swings arm 183 toward the left, as seen in Fig. 18, and moves the controlling rod and transverse slide carrying with it the holder, slide 169 and the cut-off tool, slightly away from the framework and retains it there while the cutting-off operation takes place.

The operation of the machine as a whole is briefly as follows: The amount of wire fed at each actuation is determined by the adjustment of link 49 on gear wheel 47. After each actuation of the feeding mechanism and while the feed rolls and coiling rolls are stationary, the setting mechanism operates to set the spring before it is cut off, after which the cut-off mechanism operates followed at once by another actuation of the feeding mechanism. In the making of barrel, cone and other springs having coils of varying diameter, the diameter of successive coils is determined by a special mechanism which I term the diameter control. The distance of the coils apart in the longitudinal direction of the spring is determined by mechanism which I term the pitch control. In order to provide for the making of springs of unusual length and for making cone springs in pairs, large end to large end and small end to small end, I provide special means for reducing the speed of the diameter control and the pitch control with relation to the feeding mechanism so as to produce two actuations of the feeding mechanism coincidently with one actuation of the diameter control and the pitch control.

In order, in the making of springs of extra length, to make each alternate actuation of the cut-off tool abortive and in order to automatically shift the position of the cut-off tool so that it will operate alternately at the large and small ends of cone springs I provide special means for controlling the action of the cut-off tool which I term the cut-off control.

The machine provides for the making of coil springs of any length, size or style up to the normal maximum of the machine, and from any size of wire within the capacity of the machine. In addition to this, by controlling the action of the cut-off I provide for making springs of extra length up to double the normal maximum of the machine.

Having thus described my invention I claim:

1. In a machine for making coil springs, the combination with feeding mechanism and cut-off mechanism, of coiling rolls, slides by which they are carried, rotatable holders in which the slides are adjustable, and means for locking the slides and the holders after adjustment.

2. In a machine for making coil springs, the combination with feeding mechanism and cut-off mechanism, of coiling rolls, slides by which they are carried, one of said slides being free to reciprocate longitudinally, a cam, and mechanism intermediate said cam and the reciprocating slide, whereby progressive increase or decrease in the diameter of the coils is produced.

3. In a machine for making coil springs, the combination with feeding mechanism and cut-off mechanism, of coiling rolls, slides by which they are carried, holders for said slides, one of said slides being free to reciprocate in its holder, a second slide in said holder to which the first slide is connected, means for adjusting the first slide longitudinally with relation to the second slide, a cam, and intermediate connections between the cam and the second slide whereby progressive increase or decrease in the diameter of the coils is produced.

4. In a machine for making coil springs, the combination with feeding mechanism and cut-off mechanism, of coiling rolls, slides by which they are carried, holders for said slides, one of said slides being free to reciprocate in its holder, a second slide in said holder to which the first slide is connected, a spring acting to retract the slides in the last-mentioned holder, a cam, and connections intermediate the cam and the slides in the last-mentioned holder, whereby progressive decrease or increase in the diameter of the coils is produced.

5. In a machine for making coil springs, the combination with feeding mechanism and cut-off mechanism, of coiling rolls, slides by which they are carried, rotatable holders for said slides, one of said slides being free to reciprocate in its holder, a cam, and mechanism intermediate the cam and the slides, substantially as described, for the purpose specified.

6. In a machine for making coil springs, the combination with feeding mechanism and cut-off mechanism, of coiling rolls, slides by which they are carried, holders for said slides, one of said slides being free to reciprocate in its holder, a second slide in said holder to which the first slide is connected, a spring acting to retract the slides in the last-mentioned holder, a bell-crank lever engaging the second slide, a cam, a second bell-crank lever engaging the cam, and a link connecting said bell-crank levers.

7. In a machine for making coil springs, the combination with feeding mechanism and cut-off mechanism, of coiling rolls, slides by which they are carried, holders for the slides rotatable on an axis at right angles to the line of movement of the slides, one of said slides being free to reciprocate in its holder, a second slide in said holder to which the first slide is connected, a bell-crank lever engaging the second slide, a cam, a second bell-crank lever engaging the cam, a link connecting the bell-crank levers, and a spring for retaining the second bell-crank lever in engagement with the cam.

8. In a machine for making coil springs, the combination with feeding mechanism, coiling mechanism and cut-off mechanism, of a pusher adapted to bear upon a formed coil and impart a permanent bend to the wire and separate said coil from the coil that is being formed.

9. In a machine for making coil springs, the combination with feeding mechanism, coiling mechanism and cut-off mechanism, of a pusher adapted to bear upon a formed coil and separate said coil from the coil that is being formed and means for determining the throw of the pusher and consequent spacing apart of the coils.

10. In a machine for making coil springs, the combination with feeding mechanism, coiling mechanism and cut-off mechanism, of a pusher adapted to bear upon a formed coil and means for adjusting said pusher to varying sizes of wire and diameters of coils.

11. In a machine for making coil springs, the combination with feeding mechanism, coiling mechanism and cut-off mechanism, of a pusher adapted to bear upon a formed coil, for the purpose set forth, a rod by which said pusher is carried, a cam, and adjustable connections intermediate the cam and the rod.

12. In a machine for making coil springs, the combination with feeding mechanism, coiling mechanism and cut-off mechanism, of a pusher adapted to bear upon a formed coil, for the purpose set forth, a rod by which said pusher is carried, a cam, a shaft by which the cam is carried, an arm having a yoke which straddles the shaft and a roll engaging the cam, and a swinging arm to which said arm and the rod are adjustably connected to determine the throw of the pusher.

13. In a machine for making coil springs, the combination with feeding mechanism, coiling mechanism and cut-off mechanism, of a pusher adapted to bear upon a formed coil, for the purpose set forth, a rod by which the pusher is carried, a spring-controlled swinging arm to which the rod is adjustably connected, a cam, and intermediate connections between said cam and the arm.

14. In a machine for making coil springs, the combination with feeding mechanism, coiling mechanism and cut-off mechanism, of a pusher adapted to bear upon a formed coil, a spring-controlled swinging arm to which the pusher is adjustably connected, adjustably connected, a cam, an arm connected to the swinging arm and carrying a roll engaging the cam, and a spring engaging the swinging arm, for the purpose set forth.

15. In a machine for making coil springs, the combination with feeding mechanism, coiling mechanism and cut-off mechanism, of a pusher adapted to bear upon a formed coil and a cam and intermediate connections for determining the throw of the pusher.

16. In a machine for making coil springs, the combination with feeding mechanism and cut-off mechanism, of mechanism for causing a predetermined decrease or increase in the diameter of the coils and mechanism for determining the distance of the coils apart in the longitudinal direction of the spring.

17. In a machine for making coil springs, the combination with coiling mechanism and cut-off mechanism, of mechanism for progressively decreasing or increasing the diameter of the coils and mechanism for determining the distance of the coils apart in the longitudinal direction of the spring.

18. In a machine for making coil springs, the combination with coiling mechanism and cut-off mechanism, of mechanism for setting each completely formed spring before it is cut off.

19. In a machine for making coil springs, the combination with coiling mechanism and cut-off mechanism, of mechanism for causing a predetermined decrease or increase in the diameter of the coils and mechanism for setting each completely formed spring before it is cut off.

20. In a machine for making coil springs, the combination with coiling mechanism and cut-off mechanism, of mechanism for progressively decreasing or increasing the diameter of the coils, mechanism for determining the distance of the coils apart in the longitudinal direction of the spring, and mechanism for setting each completely formed spring before it is cut off.

21. In a machine for making coil springs, the combination with coiling mechanism and cut-off mechanism, of a setting plunger which acts upon the spring while held by the coiling mechanism.

22. In a machine for making coil springs the combination with intermittently acting feeding mechanism, coiling mechanism and cut-off mechanism, of mechanism for setting each spring while the feeding mechanism is inoperative and the spring is held by the coiling mechanism.

23. In a machine for making coil springs the combination with coiling rolls, of a setting plunger and means for actuating said plunger while the spring is held by the rolls.

24. In a machine for making coil springs the combination with coiling mechanism, of setting mechanism acting while the spring is held by the coiling mechanism.

25. In a machine for making coil springs the combination with coiling mechanism, of mechanism for setting each spring while held by the coiling mechanism.

26. In a machine for making coil springs the combination with intermittently acting feeding mechanism and coiling mechanism, of mechanism for setting each spring while the feeding mechanism is inoperative.

27. In a machine for making coil springs, the combination with coiling rolls, of a setting plunger whose axial line is parallel with but slightly outside the axial line of the spring, and a supporting plate whereby buckling of the spring is prevented.

28. In a machine for making coil springs the combination with coiling rolls, of a setting plunger, a supporting plate, means for adjusting said plunger, and means for adjusting said plate.

29. In a machine for making coil springs the combination with coiling rolls, of a setting plunger and means for adjusting said plunger with relation to the axial line of the spring.

30. In a machine for making coil springs the combination with coiling rolls, of a setting plunger and means for adjusting the throw of the plunger.

31. In a machine for making coil springs, the combination with coiling mechanism and a setting plunger, of an adjustable bracket by which the plunger is carried, a cam, a lever pivoted to the bracket and engaging the cam, and a link pivoted to the lever and adjustably connected to the plunger.

32. In a machine for making coil springs, the combination with coiling mechanism and a setting plunger, of a bracket by which the plunger is carried, a cam, and operating connections between said cam and the plunger.

33. In a machine for making coil springs, the combination with coiling mechanism and a setting plunger, of a bracket by which the plunger is carried, a cam, a lever pivoted to the bracket and engaging the cam, a link intermediate the lever and the plunger, and a spring acting to retain the lever in engagement with the cam.

34. In a machine for making coil springs, the combination with coiling mechanism and a setting plunger, of a bracket by which the plunger is carried, a cam, operating connections intermediate said cam and the plunger, means for adjusting said bracket longitudinally, and means for adjusting said bracket transversely.

35. In a machine for making coil springs, the combination with coiling mechanism and a setting plunger, of a bracket by which the plunger is carried, a plate, a rib and groove connection between said bracket and plate, means for adjusting said plate and with it the bracket transversely, a cam, and operating connections intermediate said cam and the plunger.

36. In a machine for making coil springs, the combination with coiling mechanism and a setting plunger, of a bracket by which the plunger is carried, a plate, a rib and groove connection between said bracket and plate, means for locking said bracket to the plate, a second bracket, a screw in said second bracket engaging the plate, for the purpose set forth, a cam, and operating connections between said cam and the plunger.

37. In a machine for making coil springs, the combination with coiling mechanism and a setting plunger, of a bracket by which the plunger is carried, a plate, a rib and groove connection between said bracket and plate, a second bracket, a screw in said second bracket engaging the plate whereby the axial line of the plunger may be adjusted to right and left-hand springs, a cam, and operating connections between said cam and the plunger.

38. In a machine for making coil springs, the combination with coiling mechanism, of mechanism for setting each spring and means for preventing the spring from buckling.

39. In a machine for making coil springs, the combination with coiling rolls, of a setting plunger and an adjustable supporting plate, for the purpose set forth.

40. In a machine for making coil springs, the combination with intermittently acting feeding mechanism and coiling mechanism, of cut-off mechanism and mechanism for causing the cut-off mechanism to act during alternate inoperative periods of the feeding mechanism.

41. In a machine for making coil springs, the combination with feeding mechanism and coiling mechanism, of a reciprocating cut-off tool and means for adjusting said tool for different sizes and winds of springs.

42. In a machine for making coil springs, the combination with coiling mechanism and a reciprocating cut-off tool, of a cut-off die lying within the coils and means for adjusting said die for different sizes and winds of springs.

43. In a machine for making coil springs, the combination with coiling mechanism, of a reciprocating cut-off tool, a cut-off die lying within the coils, and means for adjusting said tool and said die for different sizes and winds of springs.

44. In a machine for making coil springs, the combination with a cut-off die and a cut-off tool, of a slide by which the tool is carried, a holder in which the slide reciprocates, a table by which the holder is carried, and means for adjusting the table to cause the tool to act radially to the axis of a spring.

45. In a machine for making coil springs, the combination with a cut-off die and a reciprocating cut-off tool, of means for causing the tool to act radially to the axis of a spring.

46. In a machine for making coil springs, the combination with a cut-off die and a cut-off tool, of a slide by which the tool is carried, a holder in which the slide reciprocates, a table by which the holder is carried, and means for adjusting the holder transversely to the table for different lengths of springs and pitches of coils.

47. In a machine for making coil springs, the combination with a cut-off tool, a slide by which it is carried and a holder in which the slide reciprocates, of a table by which the holder is carried, a transverse slide, means for locking said slide to the holder, and a controlling rod engaging the transverse slide whereby the point of operation of the cut-off tool is caused to alternate.

48. In a machine for making coil springs, the combination with a cut-off tool, a slide by which it is carried and a holder in which the slide reciprocates, of a table by which the holder is carried and a controlling rod whereby the point of operation of the cut-off tool is caused to alternate.

49. In a machine for making coil springs, the combination with a cut-off tool, a slide by which it is carried and a holder in which the slide reciprocates, of a table by which the holder is carried, means for adjusting said table for the purpose set forth, a transverse slide, means for locking said slide to the holder, and a controlling rod engaging the transverse slide.

50. In a machine for making coil springs, the combination with a cut-off tool, a slide by which it is carried and a holder in which the slide reciprocates, of a table, a transverse slide, means for locking said slide to the table, a controlling rod engaging the slide, and a cam and pivoted arm for actuating the rod, whereby the point of operation of the cut-off tool is caused to alternate.

51. In a machine for making coil springs, the combination with coiling mechanism and mechanism for progressively changing the diameter of the coils, of a reciprocating cut-off tool and means for causing the point of operation of said tool to alternate, whereby the large and small ends of cone springs may be cut without waste.

52. In a machine for making coil springs, the combination with coiling mechanism and mechanism for progressively changing the diameter of the coils, of a reciprocating cut-off tool, a holder by which it is carried, a transverse slide secured to the holder, a controlling rod engaging the slide, and means for actuating the controlling rod.

53. In a machine for making coil springs, the combination with coiling mechanism and mechanism for progressively changing the diameter of the coils, of a reciprocating cut-off tool, a holder by which it is carried, a transverse slide, means for adjusting the slide and for locking it to the holder, a controlling rod engaging the slide, a cam for actuating the rod, and a spring for retaining the parts in operative position.

54. In a machine for making coil springs, the combination with coiling mechanism and mechanism for determining the pitch of the coils, of a reciprocating cut-off tool and means for causing the point of operation of said tool to alternate, whereby the large and small ends of cone springs may be cut without waste.

55. In a machine for making coil springs, the combination with coiling mechanism, mechanism for progressively changing the diameter of the coils and mechanism for determining the pitch of the coils, of a reciprocating cut-off tool and means for causing the point of operation of said tool to alternate, whereby the large and small ends of cone springs may be cut without waste.

56. In a machine for making coil springs, the combination with coiling rolls and means for adjusting said rolls with relation to the center of the coils to be produced, of a reciprocating cut-off tool and means for causing the point of operation of said tool to alternate, whereby the large and small ends of cone springs may be cut without waste.

57. In a machine for making coil springs, the combination with coiling rolls, mechanism for adjusting said rolls with relation to the center of the coils to be produced and mechanism for determining the pitch of the coils, of a reciprocating cut-off tool and means for causing the point of operation of said tool to alternate, whereby the large and small ends of cone springs may be cut without waste.

58. In a machine for making coil springs, the combination with coiling mechanism and a reciprocating cut-off tool, of means for adjusting said tool for different sizes and winds of springs, and means for causing the point of operation of said tool to alternate, substantially as described, for the purpose specified.

59. In a machine for making coil springs, the combination with feeding mechanism, coiling mechanism and mechanism for progressively changing the diameter of the coils, of a reciprocating cut-off tool, means for adjusting said tool for different sizes and winds of springs, and means for causing the point of operation of said tool to alternate.

60. In a machine for making coil springs, the combination with coiling mechanism and cut-off mechanism, of feeding mechanism comprising feed rolls, a loose pinion, pawl and ratchet driving connections between said pinion and the feed rolls, an oscillating segment gear engaging the pinion, a gear wheel, and a link pivoted to the segment gear and having a radially adjustable connection to the gear wheel, whereby the throw of the segment gear may be adjusted to cause the feeding of a required amount of wire.

61. In a machine for making coil springs, the combination with coiling rolls and feed rolls geared together, of a loose pinion, a disk moving therewith, a ratchet moving with one of the feed rolls, pawls carried by the disk and engaging the ratchet, an oscillating segment gear engaging the pinion, a gear wheel, and a link pivoted to the segment gear and having a radially adjustable connection to the gear wheel.

62. In a machine for making coil springs, the combination with coiling mechanism and cut-off mechanism, of feed rolls, an oscillating segment gear by which they are driven, and means for adjusting the throw of said gear, whereby the length of wire allowed for a spring is determined independently of the cut-off mechanism.

63. In a machine for making coil springs, the combination with coiling mechanism and cut-off mechanism, of feed rolls, an oscillating segment gear by which they are driven, a gear wheel, a link pivoted to the segment gear, a stud on which the other end of said link is pivoted, and means for adjusting said stud radially on the gear wheel.

64. In a machine for making coil springs, the combination with feeding mechanism, coiling mechanism and cutting-off mechanism, of mechanism for controlling the diameter of the coils, mechanism for controlling the pitch of the coils, change speed mechanism whereby the speed of the diameter controlling and pitch controlling mechanisms may be reduced, and means for rendering each alternate actuation of the cut-off mechanism inoperative, substantially as described, for the purpose specified.

65. In a machine for making coil springs, the combination with feeding mechanism and coiling mechanism, of a reciprocating cut-off tool, change speed mechanism for the purpose set forth, and means for automatically changing the point of operation of the cut-off tool.

66. In a machine for making coil springs, the combination with feeding mechanism and coiling mechanism, of change speed mechanism for the purpose set forth, a reciprocating cut-off tool, a holder by which it is carried, a controlling rod engaging the holder, and means for actuating the controlling rod, whereby the point of operation of the cut-off tool is caused to change automatically.

67. In a machine for making coil springs, the combination with feeding mechanism and coiling mechanism, of change speed mechanism for the purpose set forth, a cut-off tool, a slide by which it is carried, a holder in which the slide reciprocates, a controlling rod engaging the holder, and means for actuating the controlling rod.

68. In a machine for making coil springs, the combination with feeding mechanism and coiling mechanism, of change speed mechanism for the purpose set forth, a reciprocating cut-off tool, a holder therefor, a controlling rod engaging the holder, and a cam by which the controlling rod is actuated.

69. In a machine for making coil springs, the combination with feeding mechanism and coiling mechanism, of change speed mechanism, a cut-off tool, a slide by which it is carried and which is provided with a stepped roll for the purpose set forth, a grooved cam engaged by said roll, a holder in which the slide reciprocates, a controlling rod engaging the holder, and a cam by which the controlling rod is actuated.

70. In a machine for making coil springs, the combination with feeding mechanism and coiling mechanism, of change speed mechanism, a cut-off tool, a slide by which it is carried and which is provided with a stepped roll, a grooved cam engaged by said roll, a holder in which the slide reciprocates, a transverse slide adjustably secured to the holder, a controlling rod engaging the slide, and means for actuating the controlling rod to change the point of operation of the cut-off tool or to render alternate actuations of said tool inoperative.

71. In a machine of the character described, the combination with coiling mechanism and cut-off mechanism, of feeding mechanism, means for adjusting said mechanism to feed a predetermined amount of wire at each actuation, and means for rendering each alternate actuation of the cut-off mechanism inoperative.

72. In a machine of the character described, the combination with coiling mechanism, of feed rolls, an oscillating segment gear by which they are driven, means for adjusting the throw of said gear to determine the length of wire fed at each actuation, a reciprocating cut-off tool, and means for rendering each alternate actuation of said tool inoperative.

73. In a machine of the character described, the combination with coiling mechanism, of mechanism for feeding a predetermined amount of wire at each actuation, a reciprocating cut-off tool, and means for shifting said tool bodily in a lateral direction.

74. In a machine of the character described, the combination with coiling mechanism and means for progressively changing the diameter of the coils, of a reciprocating cut-off tool and means for shifting said tool bodily in a lateral direction.

75. In a machine of the character described, the combination with coiling mechanism and means for progressively changing the diameter of the coils, of a cut-off tool, a slide in which said tool reciprocates, a holder for the slide, and a controlling rod for imparting lateral movement to the holder.

76. In a machine of the character described, the combination with coiling rolls and means for adjusting said rolls with relation to the center of the coils to be produced, of a reciprocating cut-off tool and means for varying the point of operation of said tool.

77. In a machine of the character described, the combination with coiling mechanism and cut-off mechanism, of feeding mechanism, means for adjusting said mechanism to feed a predetermined amount of wire at each actuation, and means for controlling the operation of the cut-off mechanism.

78. In a machine of the character described, the combination with coiling mechanism and setting mechanism acting while the spring is held by the coiling mechanism, of cut-off mechanism and means for controlling the operation of the cut-off mechanism.

79. In a machine of the character described, the combination with feeding mechanism, means for adjusting said mechanism to feed a predetermined amount of wire, coiling mechanism and means for controlling the pitch of the coils, of cut-off mechanism and means for controlling the operation of said mechanism.

80. In a machine of the character described, the combination with feeding mechanism and coiling mechanism, of means for controlling the pitch of the coils, a reciprocating cut-off tool and means for causing said tool to act radially to the axis of the spring.

81. In a machine of the character described, the combination with coiling rolls and means for adjusting said rolls to produce a required diameter of coils, of means for controlling the pitch of the coils, a cut-off tool, and means for controlling the point of operation of said tool.

82. In a machine of the character described, the combination with coiling rolls and means for adjusting said rolls with relation to the center of the coils, of means for controlling the pitch of the coils and cut-off mechanism.

83. In a machine of the character described, the combination with coiling rolls and means for controlling the pitch of the coils, of a setting plunger and a cut-off tool.

84. In a machine of the character described, the combination with feeding mechanism, means for adjusting said mechanism to feed a predetermined amount of wire, and coiling mechanism, of means for controlling the pitch of the coils, a setting plunger, and a cut-off tool.

85. In a machine of the character described, the combination with feeding mechanism, coiling rolls, and means for adjusting said rolls for the purposes set forth, of setting mechanism and cut-off mechanism acting after the setting mechanism.

86. In a machine of the character described, the combination with feeding mechanism, coiling mechanism, and means for determining the pitch of the coils, of setting mechanism, cut-off mechanism, and mechanism for controlling the action of the cut-off mechanism.

87. In a machine for making coil springs, the combination with intermittently acting feeding mechanism and coiling mechanism, of cut off mechanism and mechanism for preventing effective operation of the cut off during two or more successive operations of the feeding mechanism.

In testimony whereof I affix my signature in presence of two witnesses.

ARTHUR J. LEWIS.

Witnesses:
 Louis C. Hobart,
 Albert Pott.